Oct. 24, 1972  B. J. GAFFNEY  3,700,521
METHOD FOR THE EXTRUSION OF PLASTIC NET AND NETLIKE STRUCTURES
Filed Nov. 10, 1969  4 Sheets-Sheet 2

INVENTOR.
BERNARD J. GAFFNEY
BY Eyre, Mann & Lucas
ATTORNEYS

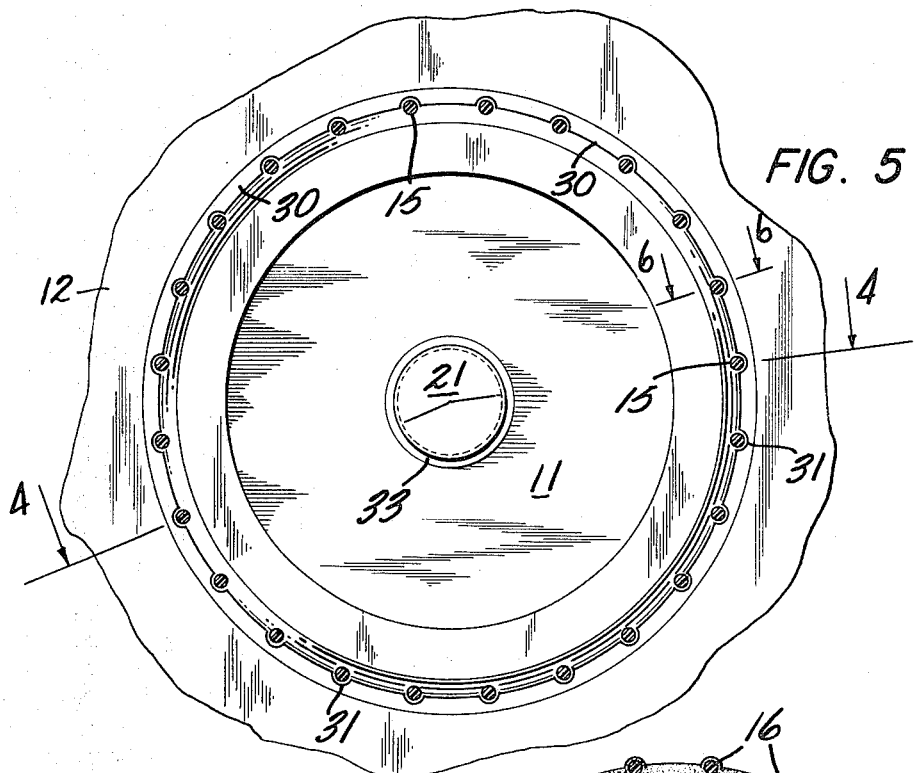
FIG. 5
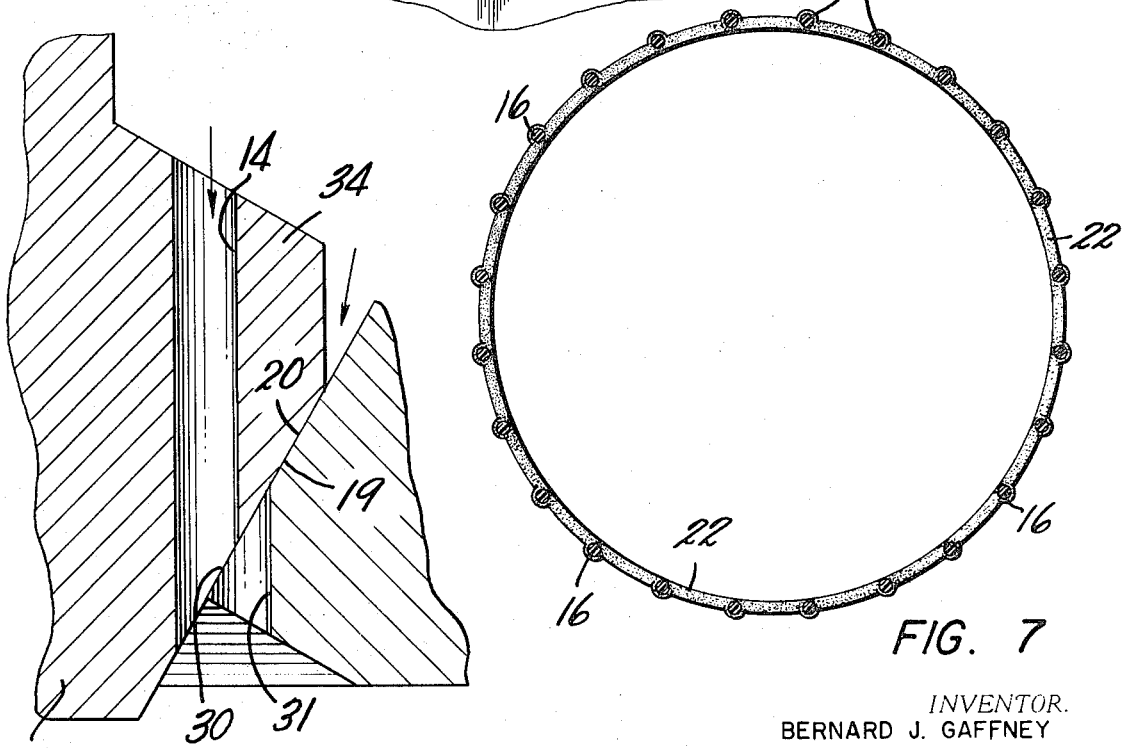
FIG. 6
FIG. 7
INVENTOR.
BERNARD J. GAFFNEY
BY Eyre, Mann & Lucas
ATTORNEYS Oct. 24, 1972　　　　B. J. GAFFNEY　　　　3,700,521
METHOD FOR THE EXTRUSION OF PLASTIC NET AND NETLIKE STRUCTURES
Filed Nov. 10, 1969　　　　　　　　　　　　　　4 Sheets-Sheet 4

INVENTOR.
BERNARD J. GAFFNEY

BY Eyre, Mann & Lucas

ATTORNEYS

3,700,521
METHOD FOR THE EXTRUSION OF PLASTIC NET AND NETLIKE STRUCTURES

Bernard J. Gaffney, Stillwater, Minn., assignor to Conwed Corporation
Filed Nov. 10, 1969, Ser. No. 875,476
Int. Cl. B29c 19/00; D04h 3/16
U.S. Cl. 156—167
5 Claims

ABSTRACT OF THE DISCLOSURE

An improved extrusion apparatus and method for the extrusion of plastic net and netlike structures is provided. The apparatus is comprised of a plurality of die members at least one of which reciprocates in a vertical direction. One of the die members has a plurality of orifices therein for the extrusion of a first group of strands and at least one other die member has a forming surface thereon which coacts with a second forming surface on another die member to form a variable opening for the independent extrusion of a second group of strands. The distance between each orifice is maintained constant and the second group of strands is extruded at a point below that at which the orifices communicate with a polymer supply. The forming surfaces and orifices are so arranged relative to each other that at least one group of strands is forcefully urged toward the other group to cause the two groups of strands to weld together subsequent to extrusion.

---

The extrusion apparatus of the present invention is comprised of a plurality of die members for the extrusion of molten polymer to form plastic net and netlike products. At least one of the die members has a plurality of orifices therein with a set predetermined opening, for the extrusion of a first group of strands. A second die member has a forming surface thereon parallel to a similar surface on the first or on another die member with which it coacts to form a restricted polymer flow path for the separate extrusion of a second group of strands substantially normal to the first group when the surfaces are separated to permit polymer to flow therebetween. A constant distance is maintained between each orifice and the orifices and the opening between the forming surfaces are not connected whereby the first group of strands and the second group of strands are separately extruded. This separation between the orifices and opening of the forming surfaces permits the forming surfaces to be opened to extrude the second group of strands without stopping or significantly slowing the rate of extrusion of the first group of strands as may occur where only a single variable orifice is provided for the integral extrusion of both the first and second group of strands. In most instances, the first group of strands are extruded as a plurality of parallel longitudinal strands and the second group is extruded as a succession of single strands positioned transverse to the longitudinal strands.

The die members may be arranged in a line for the extrusion of a flat net or the die members can be in a circular arrangement for the extrusion of a tubular net.

Polymer such as polypropylene is fed to the orifices which may have any cross sectional shape and the opening between the forming surfaces from either a single pressurized pool of molten polymer or from separate pressurized pools which force the molten polymer to extrude. To achieve a high strength bond between the two groups of strands, the arrangement of the orifices and the forming surfaces must be such as to direct one group of strands toward the other to cause bonding at the point where contact occurs. The forming surfaces help to shape the strand as the polymer flows therebetween and these surfaces materially assist in controlling the velocity and direction of expulsion of the strand. In most cases, the best bond is achieved by extruding the longitudinal strands in a vertical direction with the transverse strand extruded from between the forming surfaces which are positioned at an angle to the longitudinal strands. In this way, the transverse strand is directed toward the longitudinal strands and, due to the pressure behind the transverse strand, there is a tendency for some intermixing of the polymer of both strands to give a welded bond rather than a mere tack on type of bond in which only the surface layers of the strands are in contact. The length of the forming surfaces is preferably at least equal to the thickness of the strand so that upon closing, the forming surfaces will squeeze the polymer flowing therebetween to increase the expulsion velocity of the polymer and its tendency to intermix with the longitudinal strands.

When an open pore net is to be manufactured by the dies of the present invention, the die member must be reciprocated to open the forming surfaces at predetermined intervals. The die member must be reciprocated between a first position in which the forming surfaces are in contact with each other and a second position in which the forming surfaces are separated by a predetermined distance approximately equal to the desired thickness of the extruded transverse strand. The size of the transverse strand is determined by the distance between the separated forming surfaces, the amount of time that the forming surfaces remain separated and by the magnitude of the pressure used to force the polymer to extrude. However, the extruded thickness of the transverse strand is generally somewhat greater than the distance between the separated forming surfaces due to expansion of the polymer as it is extruded. It is within the skill of the art to determine the relationship between the variables and the exact distance needed between forming surfaces to achieve a desired extruded strand size and thickness. The length of the extruded transverse strand is determined by the length of time the forming surfaces are separated. Reciprocation or cyclic movement of one of the die members and the feeding of the hot plastic under pressure to the die members of the present invention for extrusion of plastic products is carried out in conventional manner well known in the art. For example, one method and apparatus for automatically controlling the movement of the die members to extrude plastic net and other products is described in a copending application Ser. No. 877,686, filed Nov. 18, 1969 and now abandoned. The orifices for extruding the longitudinal strands may be positioned in the moveable or stationary die member or in both of the die members and any number of die members may be employed. If desired, a group of longitudinal strands may be extruded on both sides of the transverse strands simply by providing a plurality of orifices in both die members and the orifices may be angled to direct the longitudinal strands against the extruded transverse strand.

In all cases, separate longitudinal and transverse extrusion orifices are used so that the extrusion of each strand is carried out independently and the transverse strand is discharged from between the forming surfaces below the point at which the longitudinal strand extrusion orifices communicate with the pressurized pool of polymer.

If desired, the orifice openings for the longitudinal strands may be reduced in size as the forming surfaces open in order to balance the total polymer flow between the longitudinal orifices and the transverse opening to bring the thickness of the net at the point of cross over of the strands down to the thickness of one individual strand. A conventional baffle timed to restrict or completely close the opening of the longitudinal strand orifices may be employed for this purpose.

The dies of the instant invention may also be used to extrude a solid sheet with longitudinal ribs by permitting the forming surfaces to always remain open.

Referring now to the drawings in which are depicted various embodiments of the preferred instant invention and in which like numerals refer to like parts:

FIG. 5 is a bottom view taken along line 5—5 of FIG. 4.

FIG. 6 is an enlarged detail view of the extrusion orifice and forming surfaces taken along line 6—6 of FIG. 6.

FIG. 7 is a cross sectional plan view of a product produced by the dies of FIG. 4.

Figure 1:
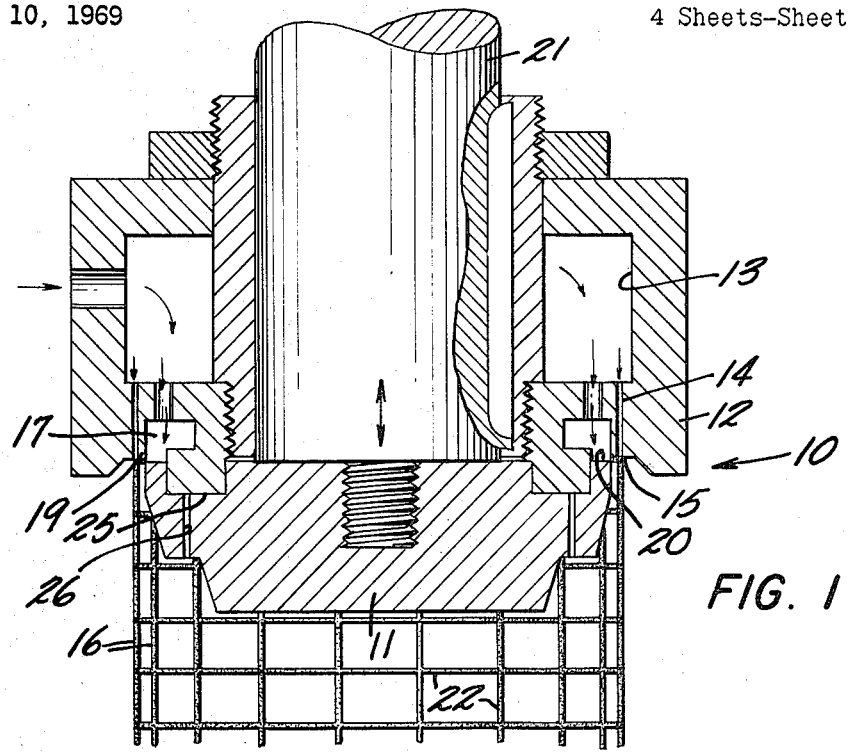
FIG. 1 is a sectional view of one form of die embodying the principles of this invention.

Referring now to FIG. 1, the die assembly 10 has an inner moveable round die member 11 that is reciprocated in vertical direction in conventional manner and an outer stationary round die member 12. Die member 12 has an annular cavity 13 therein to which molten polymer is supplied under pressure by conventional means such as a screw extruder (not shown).

Die member 12 has a plurality of holes 14 bored therein (two only shown) which are in fluid communication with the polymer of cavity 13 and with the orifice opening 15. Longitudinal strands 16 are continuously extruded through holes 14 and orifices 15. In the embodiment shown, orifices 15 are arranged in a circle to extrude the plurality of longitudinal strands in a circle. However, the orifices 15 may be arranged in a rectangular or other square pattern to extrude the strands in other than a circular arrangement.

The annular cavity 13 is also in fluid communication with an annular surface 19 on die member 12 with an annular forming surface 20 on die member 11. Die member 11 is mounted on a reciprocating shaft 21 which causes the member to move up and down in vertical direction. In the position shown in FIG. 1, the forming surfaces 19, 20 are closed and no polymer can flow between the surfaces. Upon movement of shaft 21 downwardly, the forming surfaces 29, 30 separate whereupon polymer from cavity 17 flows under pressure in between the two forming surfaces and, as the surfaces close, the polymer is squeezed out to complete the formation of a transverse strand 22.

Forming surfaces 19, 20 are positioned perpendicular to the direction of extrusion of longitudinal strands 16 and as a result, the transverse strand is directed to move into the longitudinal strand to form a welded bond between the strands. The length of forming surfaces 19, 20 is equal to the thickness of the transverse strand and with this construction, the strand is shaped between the forming surfaces and then expelled against the longitudinal strands by the squeezing action of the forming surfaces as they close to cut off the polymer.

The orifices 15 are set a predetermined distance apart and they are separated from the forming surfaces so that the longitudinal and transverse strands are extruded independently of each other. The strands are joined together at a point below that place where the orifice is connected to cavity 13 so that the longitudinal strand is completely formed before the two are joined together. By extruding the transverse and longitudinal strands separately, the extrusion of one has little influence on the extrusion of the other and the extrusion variables, as for instance pressure within the orifices which in part defines the shape of the longitudinal strands, will not be materially affected by the opening of the forming surfaces for extrusion of the transverse strands.

Figure 2:
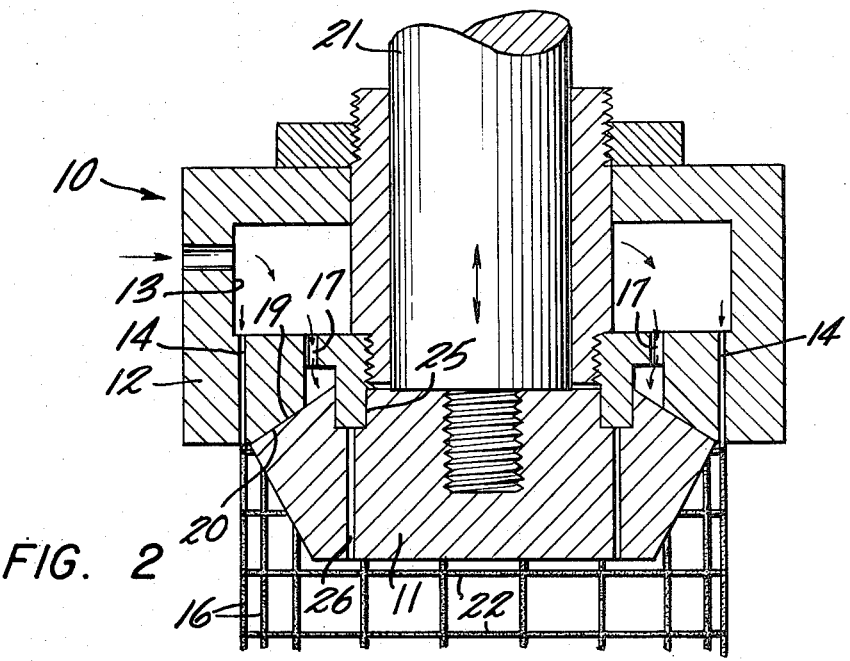
FIG. 2 is a sectional view of another form of die.

The FIG. 2 embodiment of the die is essentially the same as the FIG. 1 embodiment. The only difference between them is that the annular forming surfaces 19, 20 in the die of FIG. 2 are of somewhat greater length than shown in FIG. 1 and the forming surfaces are slanted downwardly towards longitudinal strands 16. Slanting the forming surfaces downwardly i.e. placing them at a positive angle less than 90° from the horizontal as depicted in the drawing wherein 23 denotes the horizontal and arrow 24 denotes the direction in which the positive angle is to be measured, is of advantage in that as the forming surfaces close to cut off polymer flow, an added force component is imposed on the flowing polymer in the direction of extrusion which is the resultant of the force used to close the die members. The added force component enhances the squeezing effect and it tends to increase the bond strength between the longitudinal and transverse strands.

In the embodiments of both FIGS. 1 and 2, the high pressure used to extrude the polymer into strands will often force the polymer into any clearance space such as 25 between the die members 11 and 12. Polymer in the clearance space 25 will subsequently work its way up along the surface of the shaft 21 where the polymer is kept hot due to the heat of the shaft. The polymer will eventually degrade and cause gumming and sticking of the shaft. Normally, periodic removal and cleaning of the shaft is necessary. To avoid this problem, a plurality of weep holes 26 are provided in communication with space 25. Weep holes 26 have a large diameter opening whereby polymer will flow more easily into the weep holes and out to the atmosphere rather than up along the shaft. If desired, the die member 12 may be reciprocated instead of die member 11 or both may be reciprocated in opposite directions by conventional means. In addition to the above, the forming surfaces may be placed outside the longitudinal orifices to extrude horizontal strands inwardly against the longitudinal strands instead of outwardly as shown.

Figure 3:
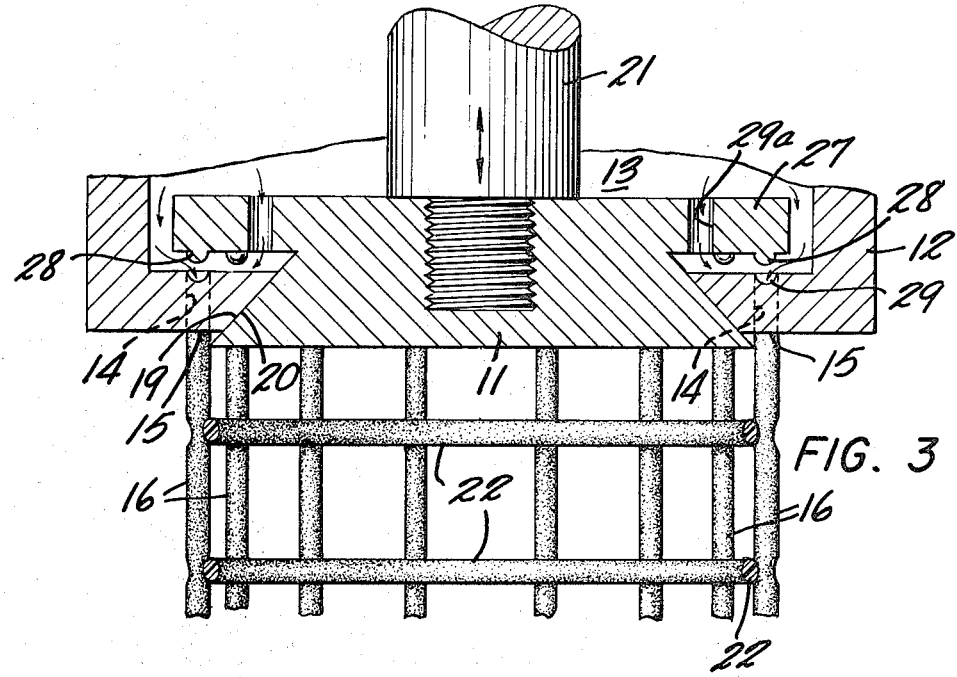
FIG. 3 is a sectional view of still another form of die.

Referring to FIG. 3, another form of die is shown in which the inner die 11 is extended upwardly above the point at which extrusion holes 14 connect with cavity 13. Inner die 11 has an inwardly extending annular flange 27 on which a plurality of half sphere plugs 28 are mounted by conventional means. One plug 28 is provided for each one of the holes 14 which are dished at 29 to decrease the flow of polymer from orifices 15. In addition, a plurality of orifices 29a are spaced around the circumference of flange 27 to permit polymer to flow to the forming surfaces 19 without encountering the obstruction imposed on flow by plugs 28. In this manner, the flow of polymer may be balanced to decrease the thickness of the joint formed between the strands.

Figure 4:
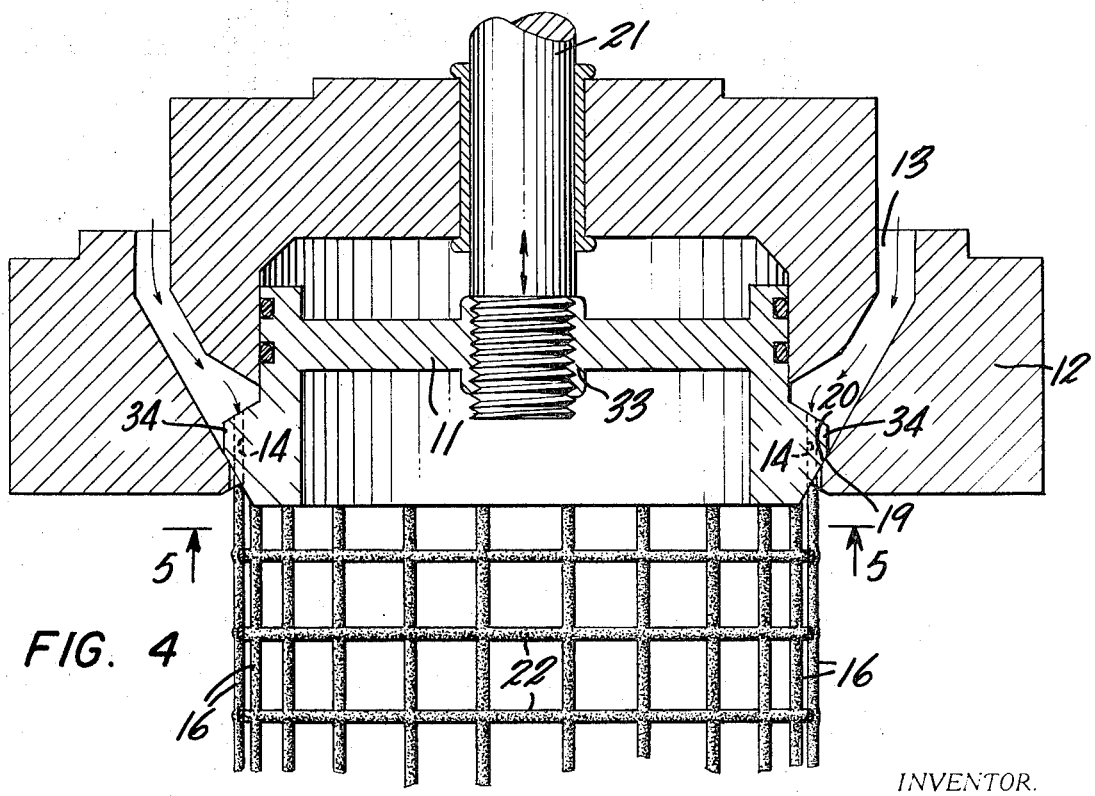
FIG. 4 is a sectional view of still another form of die embodying the principles of this invention and in which the orifices for the extrusion of the longitudinal strands move in a vertical direction.

Referring now to FIGS. 4 through 6, there is seen another die embodying the principles of this invention. In this embodiment, the stationary outer die member 12 has its annular forming surface 19 extending inwardly approximately half way across orifice 15 as seen at 30 in FIG. 5. The portion of the forming surface 19 which extends into orifice 15 is drilled or cut back at 31 so as not to interfere with the continuous extrusion of the longitudinal strands 16. Die member 11 in this embodiment is a vertically reciprocating collar which has an opening 33 therein for accepting shaft 21 which is conventionally keyed to the die member 11 (not shown). Die member 11 has an annular flange 34 in which the orifices 15 are located, along with the annular forming surface 20.

In operation, the longitudinal strands 16 are continuously extruded from the annular cavity 13. When die member 11 is moved upwardly from the position shown in FIGS. 4 and 6, the annular forming surfaces 19, 20 separate to permit the transverse strand 22 to extrude into the longitudinal strands 16. Upward movement of the orifices 15 will tend to momentarily reduce the flow of plastic to thin out the longitudinal strand 16 at the point of contact with the transverse strand 22. This decreases the joint thickness and gives a more pleasing appearance to the net structure. Extension 30 of forming surface 19 forces portions of the transverse strand into the space between the longitudinal strands 16 and this assists in the intermixing of polymer of the longitudinal and transverse strands beyond that obtained with the other forms of die members because each longitudinal strand is partially encapsulated by the transverse strand as shown in the drawing of FIG. 7. This partial encapsulation tends to increase the strength of the bond between the polymer strands.

Although encapsulation is desired, it is not necessary and extension 30 on the forming surface 19 may be removed by cutting it back to point 31 if this is desired.

Figure 8:
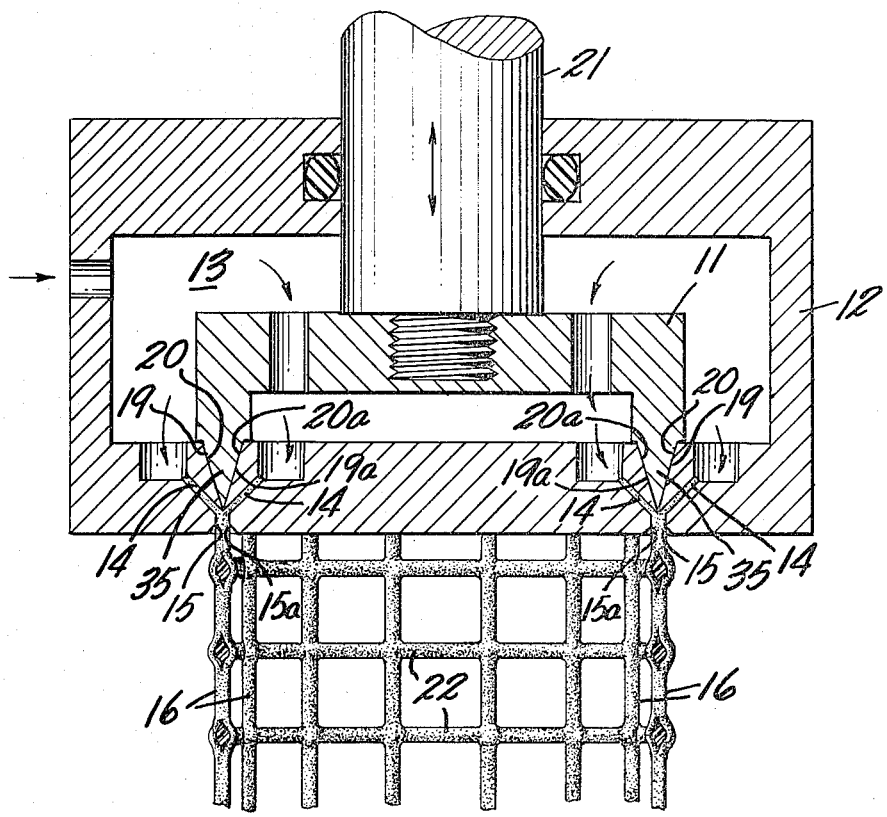
FIG. 8 is a cross sectional plan view of still another form of die embodying the principles of this invention.

Referring now to FIG. 8, the outer die member 12 has only two separate annular groups of orifices 15 and 15a respectively for the extrusion of two separate groups of longitudinal strands. Die member 12 has two forming surfaces 19 and 19a which coact with two forming surfaces 20 and 20a on the moveable die member 11. Forming surfaces 19 and 20 are positioned in between the groups of orifices 15 and 15a and the forming surfaces 20 converge to form an extension on the inner die at 35 which projects down below the orifices 15 and 15a to separate the two groups of longitudinal strands. Holes 14 that connect orifices 15 and 15a with the annular cavity 13 are angled towards each other and the two groups of longitudinal strands which are continuously extruded are separated by the extension 35 of the inner die member 11. In the position shown in the drawing the forming surfaces 19 and 20 are in contact and no polymer can flow between the surfaces. Upon upward movement of die member 11 the forming surfaces 19, 20 separate to extrude two separate polymer strands that join together to form a single transverse strand 22 below the tip of extension 35 which is now in the retracted position. Due to the retracted position of extension 35, the two groups of longitudinal strands are forcefully urged into the transverse strand 22 to form a strong, welded bond therebetween.

In all of the embodiments described above, the forming surfaces may be maintained permanently separate for the extrusion of a continuous sheet of polymer and in such case the longitudinal strands from the orifices will form reinforcing ribs on the sheet. The inner and outer die may be reciprocated and more than two die members may be used to form the desired number of strands. Additionally, more than one group of orifices and moveable surfaces may be positioned in each die member for the extrusion of a greater number of groups of strands than there are die members as in the structure of FIG. 8.

In all of the embodiments in which a tubular product is extruded, it is preferred to extrude the product over a mandrel or some other device (not shown) having somewhat larger dimensions than the product in order to place the longitudinal and transverse strands of the product under tension to promote better bonding between the two strands. If desired, the mandrel used may have an inner opening in the form of a nozzle (not shown) through which the extruding net is directed and expanded as it leaves the nozzle by nip rolls (conventional) or other means to place the strands of the net under tension by the restriction imposed on movement of the net by the nozzle.

It is intended to cover all changes and modifications of the preferred embodiments of the invention herein chosen for the purpose of illustration which do not constitute departures from the spirit and scope of the invention.

What is claimed is:

1. A method of forming a solidifiable thermoplastic polymer netlike tube by melt extrusion which comprises the steps of:
   (a) melt extruding a plurality of strands of solidifiable thermoplastic polymer spaced from each other and arranged in tubular form;
   (b) independently and periodically melt extruding under pressure a separate strand of a solidifiable thermoplastic polymer transverse and normal to the direction of extrusion of said plurality of strands; and
   (c) directing the separately extruded strand under velocity from the pressure of extrusion towards the extruded plurality of strands whereby the separately extruded molten strand and the plurality of molten strands join together and bond into a unitary structure subsequent to the extrusion of the separately extruded strand and the plurality of strands without any outside mechanical aid.

2. The method of claim 1 wherein the thermoplastic polymer extruded to form the said plurality of strands is supplied independently of the thermoplastic polymer extruded to form the said separate strand.

3. The method of claim 1 wherein said plurality of strands are arranged in a circular form.

4. A method of forming a solidifiable thermoplastic polymer netlike tube by melt extrusion which comprises the steps of:
   (a) melt extruding a first plurality of strands of solidifiable thermoplastic polymer spaced from each other and arranged in the form of a tube;
   (b) independently and intermittently melt extruding a separate strand of a solidifiable thermoplastic polymer transverse and normal to the direction of extrusion of said first plurality of strands to form a second plurality of strands and normal to said first plurality of strands; and
   (c) directing at least one plurality of strands under velocity from the pressure of extrusion towards the other plurality of strands whereby the first plurality of molten strands and the second plurality of molten strands join together and bond into a unitary structure subsequent to the extrusion of the first plurality of strands and the second plurality of strands.

5. A method of forming a solidifiable thermoplastic polymer netlike tube by melt extrusion which comprises the steps of:
   (a) melt extruding a plurality of strands of solidifiable thermoplastic polymer spaced from each other and arranged in tubular form;
   (b) independently and periodically melt extruding under pressure a separate strand of a solidifiable thermoplastic polymer transverse and normal to the direction of extrusion of said plurality of strands; and
   (c) joining the separately extruded molten strand and the extruded plurality of molten strands while they are still molten and after they have been extruded and before they have solidified whereby the separately extruded strand and the plurality of strands join together and bond into a unitary structure subsequent to the extrusion of the separately extruded strand and the plurality of strands.

References Cited

UNITED STATES PATENTS

| | | | |
|---|---|---|---|
| 3,444,588 | 5/1969 | Martin et al. | 264—167 |
| 3,029,174 | 4/1962 | Schultheiss | 264—Net |
| 3,127,298 | 3/1964 | Nalle | 264—Net |
| 3,163,691 | 12/1964 | Anderson et al. | 264—Net |
| 3,228,063 | 1/1966 | Giutierrez | 264—Net |
| 3,252,181 | 5/1966 | Hureau | 264—Net |
| 3,308,220 | 3/1967 | Smith | 264—Net |
| 3,333,039 | 7/1967 | Hureau | 264—Net |
| 3,349,434 | 10/1967 | Hureau | 264—Net |
| 3,384,692 | 5/1968 | Galt et al. | 264—Net |
| 3,512,215 | 5/1970 | Hutcheon | 264—Net |

FOREIGN PATENTS 5,177  2/1968  Japan.

JAY H. WOO, Primary Examiner

U.S. Cl. X.R.

156—167, 242, 244; 161—109, Dig. 6; 264—167, Dig. 81